United States Patent
Canora et al.

(10) Patent No.: US 8,312,028 B2
(45) Date of Patent: *Nov. 13, 2012

(54) METHOD AND SYSTEM FOR MANAGING MEDIA ASSETS

(75) Inventors: David Canora, Winter Garden, FL (US);
Michael Colglazier, Orlando, FL (US);
Mike Gomes, Windermere, FL (US);
Beth Patterson, Celebration, FL (US);
Robert Swirsky, Sunnyvale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/476,954

(22) Filed: May 21, 2012

(65) Prior Publication Data
US 2012/0230552 A1   Sep. 13, 2012

Related U.S. Application Data

(63) Continuation of application No. 12/012,952, filed on Feb. 6, 2008.

(51) Int. Cl.
*G06F 17/30* (2006.01)
*G06Q 50/00* (2012.01)

(52) U.S. Cl. .................. 707/754; 707/938; 705/310

(58) Field of Classification Search .................. 707/736, 707/749, 754, 915, 938; 705/310
See application file for complete search history.

(56) References Cited

U.S. PATENT DOCUMENTS

| | | | | |
|---|---|---|---|---|
| 6,804,684 | B2 * | 10/2004 | Stubler et al. | 1/1 |
| 6,904,168 | B1 * | 6/2005 | Steinberg et al. | 382/165 |
| 7,127,164 | B1 * | 10/2006 | Parulski et al. | 396/287 |
| 7,693,906 | B1 * | 4/2010 | Amidon et al. | 707/749 |
| 2003/0033296 | A1 * | 2/2003 | Rothmuller et al. | 707/3 |
| 2005/0010589 | A1 * | 1/2005 | Novak et al. | 707/102 |
| 2006/0282789 | A1 * | 12/2006 | Kim | 715/764 |
| 2007/0136244 | A1 * | 6/2007 | MacLaurin et al. | 707/3 |
| 2007/0208776 | A1 * | 9/2007 | Perry et al. | 707/104.1 |
| 2007/0294173 | A1 * | 12/2007 | Levy et al. | 705/51 |

\* cited by examiner

*Primary Examiner* — James Trujillo
*Assistant Examiner* — Jorge A Casanova
(74) *Attorney, Agent, or Firm* — Farjami & Farjami LLP

(57) ABSTRACT

There is provided a method for managing the lifecycles of one or more media assets. The method comprises importing the one or more media assets into a system for managing the lifecycles of the one or more media assets, determining one or more metadata tags for association with the one or more media assets by evaluating the one or more media assets with one or more tagging filters, associating the one or more metadata tags with the one or more media assets after determining one or more metadata tags for association with the one or more media assets, and grouping the one or more media assets according to the one or more metadata tags associated with the one or more media assets by evaluating the one or more metadata tags with one or more grouping filters to generate one or more media asset groups.

8 Claims, 3 Drawing Sheets

METHOD AND SYSTEM FOR MANAGING MEDIA ASSETS

This application is a continuation of U.S. patent application Ser. No. 12/012,952, filed Feb. 6, 2008, which is incorporated by reference in its entirety.

BACKGROUND OF THE INVENTION

1. Field of the Invention

The present invention relates generally to media asset management. More particularly, the present invention relates to media asset lifecycle management.

2. Background Art

The creation rate of media assets such as audio recordings, pictures, and videos has increased tremendously because of the proliferation of digital recording and communication systems. Before this proliferation, the restricted availability of the means of producing and copying media assets meant that managing such media assets' lifecycles was relatively straightforward. Ad-hoc or manual processes were adequate for the purposes of deciding if a given media asset violated a copyright law, went against a decency guideline, or was simply no longer relevant and required deletion. Now, however, those processes tend to be overwhelmed by the flood of media assets that are created with the aid of modern technology.

The problem of media asset lifecycle management is distinct from the problem of storing such media assets. In the present state of the art, storage of media assets can be accomplished by digital content management systems, which absorb the modern content flood with relative ease, thanks to advances in areas such as hard disk drive design and relational database design. Once the media assets are stored, however, managing them over the course of their lifecycle (e.g., deciding if a particular picture is indecent, or if a particular recording contains a segment of a copyrighted work) is a difficult problem, conventional solutions to which remain rooted in old practices.

For example, several user-submitted content web sites, such as Youtube, manage very large sets of media assets in the form of user-submitted videos. The lifecycle of an exemplary video on such a website can involve import or upload processing, decency guideline violation reviewing, copyright guideline violation reviewing, and possibly deletion or elevation to a ranked or featured status. In order to review every user-submitted video for copyright violations, for example, the website can implement a variety of ad-hoc or manual processes. It can employ an army of human reviewers to look at each user-submitted video. Alternatively, it can demand copyrighted material from copyright holders to compare with its user-submitted videos in a brute-force manner. Neither of these processes scale well to manage the modern flood of user-submitted video content. Thus, the website may simply resort to waiting for a copyright holder to take some action, such as threatening or instituting a legal action, which entails major issues.

Accordingly, there is a need to overcome the drawbacks and deficiencies in the art by providing an improved method and system for managing the lifecycle of media assets.

SUMMARY OF THE INVENTION

There is provided a method and system for managing the lifecycles of media assets, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
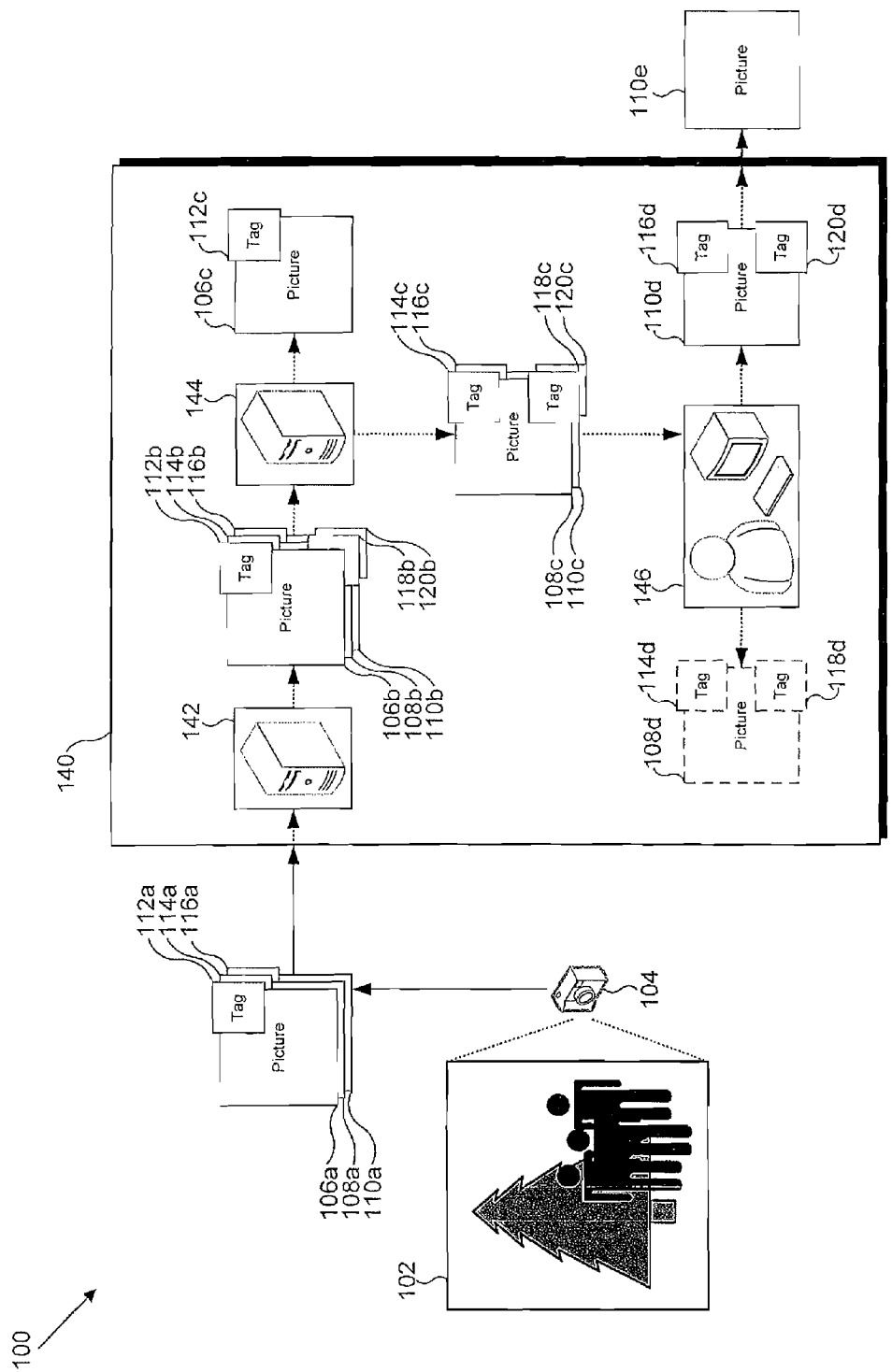
FIG. 1 shows a diagram of an exemplary system for managing the lifecycles of media assets, according to one embodiment of the present invention.

The present application is directed to a method and system for managing the lifecycles of media assets. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 shows a diagram of system 100 including media asset lifecycle manager (MALM) 140 for managing the lifecycle of media assets, according to one embodiment of the present invention. MALM 140, in this configuration, imports pictures, searches pictures for royalty-triggering content, and exports pictures for publication. In operation, camera 104, which may be, for example, a film camera or a digital camera, generates pictures 106a through 110a of scene 102. Scene 102 may be, for example, a view of guests and a costumed employee in a theme park, and camera 104 may be operated automatically or by a person, for example by another theme park employee.

Pictures 106a through 110a are, in this example, associated with metadata tags 112a through 116a. In particular, picture 106a is associated with metadata tag 112a, picture 108a is associated with metadata tag 114a, and picture 110a is associated with metadata tag 116a. As camera 104 generates pictures 106a through 110a, camera 104 may simultaneously generate and associate metadata tags 112a through 116a. In metadata tags 112a through 116a, camera 104 may record an identification tag, for example, a picture sequence number, a timestamp, or a location in the theme park where associated pictures 106a through 110a were taken. Camera 104 may contain pictures and metadata tags 106a through 116a internally in, for example, a digital memory or a roll of film. Alternatively, camera 104 may instead transmit pictures and metadata tags 106a through 116a to an external storage location (not shown).

Pictures and metadata tags 106a through 116a may be imported into MALM 140 by a variety of means. For example, pictures and metadata tags 106a through 116a may be imported into MALM 140 through an electrical connection between a memory in camera 104 and a memory in MALM 140, through a wireless connection between a radio device in camera 104 and a radio device in MALM 140, or via an external storage device (such as a flash-memory card, not shown). Pictures and metadata tags 106a through 116a may be imported simultaneously, or in separate sessions or transactions. Once imported, pictures and metadata tags 106a through 116a may be managed by utilizing various filters and/or an executive included in the present embodiment of MALM 140, such as tagging filter 142, grouping filter 144, and executive 146.

Inside MALM 140, pictures and metadata tags 106b through 116b correspond to pictures and metadata tags 106a through 116a after importation and subsequent evaluation by tagging filter 142. Tagging filter 142 may evaluate pictures and metadata tags 106a through 116a, after importation into MALM 140, in a variety of ways. For example, tagging filter 142 may evaluate picture 106a and associated metadata tag 112a to determine if one or more additional metadata tags should be associated, or if already-associated metadata tag 112a should be disassociated and removed. To make such an evaluation, tagging filter 142 may utilize the information in picture 106a, the information in metadata tag 112a, or both. Tagging filter 142 may obtain the information in picture 106a, for example, by utilizing a computerized image processing of pictures 106a and comparison other information or pictures a database. Alternatively, tagging filter 142 may utilize information from other sources to evaluate picture 106a and metadata tag 112a; for example, tagging filter 142 might utilize information in pictures 108a and 110a. Tagging filter 142 may evaluate picture 106a to determine, for example, if picture 106a contains copyrighted material, violates a decency policy, or satisfies some other criteria.

In the present embodiment, tagging filter 142 is configured to determine if later publication of pictures 106a through 110a will trigger royalty payment. Payment of a royalty might be triggered in the circumstance, for example, where a costumed employee in scene 102 appears in a picture wearing a cartoon character costume that has been licensed from an outside party. Thus, tagging filter 142 can search pictures 106a through 110a for images of a cartoon character that are protected by copyright or fall under third party licenses. In doing so, tagging filter 142 generates pictures and metadata tags 106b through 116b, and additionally generates new metadata tags 118b and 120b. In this example, picture 108b is associated with metadata tag 118b, and picture 110b is associated with metadata tag 120b. Metadata tags 118b and 120b indicate that associated pictures 108b and 110b contain an image that triggers royalty payment upon later publication.

After being generated by tagging filter 142, pictures and metadata tags 106b through 120b can be evaluated by grouping filter 144. Unlike tagging filter 142, grouping filter 144 does not associate or dissociate metadata tags from pictures. Instead, grouping filter 144 separates pictures into different groups based on the information in metadata tags associated with those pictures.

In the present embodiment, grouping filter 144 is configured to separate pictures associated with metadata tags that indicate royalty-triggering imagery from pictures that are not so associated. Thus, in evaluating pictures and metadata tags 106b through 120b, grouping filter 144 generates a first group including picture 106c and associated metadata tag 112c, and a second group including pictures 108c and 110c and associated metadata tags 114c through 120c.

After being generated by grouping filter 144, picture 106c and associated metadata tag 112c can be, for example, stored in MALM 140 for later use. In the meantime, pictures 108c and 110c and associated metadata tags 114c through 120c can be evaluated by executive 146. Unlike tagging and grouping filters 142 and 144, executive 146 has abilities that extend beyond associating and dissociating metadata tags and separating pictures into groups; for example, executive 146 can modify or delete a picture.

In the present embodiment, executive 146 is implemented as a person operating a computer terminal, and evaluates pictures according to theme park quality guidelines. Executive 146 may decide to delete picture 108c if the image is blurred or partially obscured, and retain picture 110c because the image has no such impairment. In deleting picture 108c and associated metadata tags 114c and 118c, executive 146 generates deleted picture 108d and associated deleted metadata tags 114d and 118d. Deleted picture 108d may be erased from a storage medium in MALM 140, or may be retained in some inactive capacity. Executive 146 retains picture 110c and associated metadata tags 116c and 120c by generating picture 110d and associated metadata tags 116d and 120d. Executive 146 may then dissociate metadata tags 116d and 120d and export picture 110d for publication and royalty payment, as depicted by exported picture 110e.

Thus, in MALM 140 of FIG. 1, the allocation of tasks between tagging filter 142, grouping filter 144, and executive 146 allows for efficient management of the lifecycles of pictures 106a through 110a. Utilizing a clearly defined set of procedures, MALM 140 stores picture 106a (at 106c) for later use, deletes low-quality picture 108a (at 108d), and exports for publication and royalty payment picture 110a (at 110e).

Figure 2:
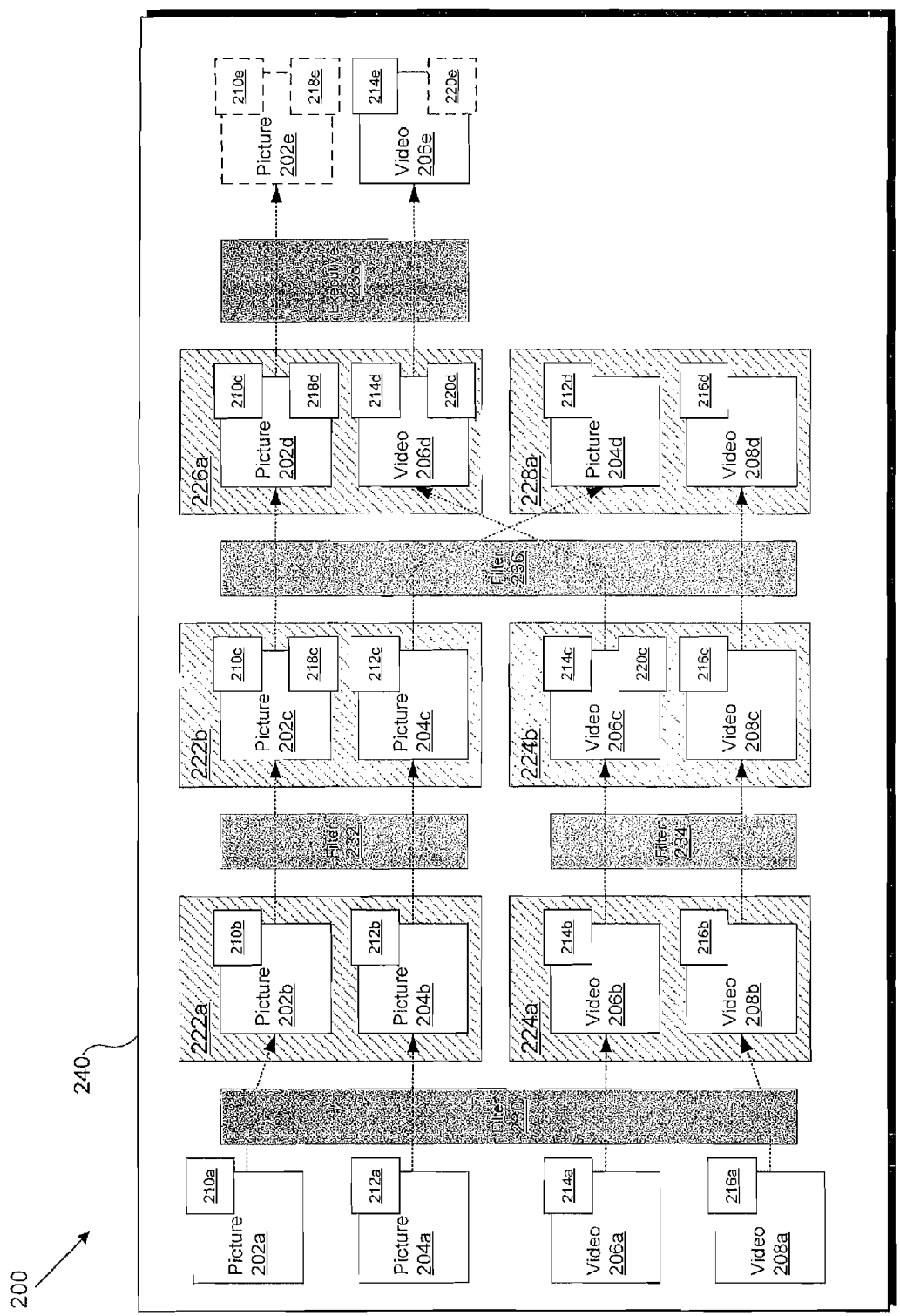
FIG. 2 shows a diagram of an exemplary system for managing the lifecycles of media assets, according to one embodiment of the present invention.

FIG. 2 shows a diagram of system 200 including media asset lifecycle manager (MALM) 240 for managing the lifecycle of media assets, according to another embodiment of the present invention. In operation, media assets pictures 202a and 204a, videos 206a and 208a, and associated metadata tags 210a through 216a are imported into MALM 240 utilizing, for example, means similar to those used to import media assets into MALM 140. Prior to importation, pictures 202a and 204a, videos 206a and 208a, and associated metadata tags 210a through 216a may have been generated by, for example, a picture and video-producing camcorder (not shown), or by more than one source.

In the present embodiment, pictures 202a and 204a and videos 206a and 208a are associated with metadata tags 210a through 216a. In particular, picture 202a is associated with metadata tag 210a, picture 204a is associated with metadata tag 212a, video 206a is associated with metadata tag 214a, and video 208a is associated with metadata tag 216a. Metadata tags 210a through 216a contain information about what kind of media asset each is associated with, and may contain other information such as, for example, a timestamp. After importation, MALM 240 can manage the lifecycles of pictures 202a and 204a and videos 206a and 208a by using filters 230 through 236 and an executive 238.

After being imported into MALM 240, pictures 202a and 204a, videos 206a and 208a, and associated metadata tags 210a through 216a can be evaluated by grouping filter 230. Grouping filter 230 can be implemented as, for example, software executing on a computer processor (not shown), or as a human using a computer terminal (not shown). Like grouping filter 144 of system 100, grouping filter 230 separates media assets into different groups based on the information in metadata tags associated with those media assets.

In the present embodiment, grouping filter 230 is configured to separate picture media assets from video media assets. Thus, after evaluating pictures 202a and 204a, videos 206a and 208a, and associated metadata tags 210a through 216a, grouping filter 230 generates group 222a including corresponding pictures 202b and 204b and associated metadata tags 210b and 212b, and group 224a including corresponding pictures 206b and 208b and associated metadata tags 214b and 216b. Group 222a is a group of picture media assets, and group 224a is a group of video media assets.

After being sorted into group 222a, pictures 202b and 204b and associated metadata tags 210b and 212b can be evaluated by tagging filter 232. Tagging filter 232 may evaluate media assets and associated metadata tags in a variety of ways. For example, tagging filter 232 may evaluate picture 202b and associated metadata tag 210b to determine if one or more additional metadata tags should be associated, or if already-associated metadata tag 210b should be removed. To make such an evaluation, tagging filter 232 may utilize the information in picture 202b, in metadata tag 210b, or in both. Tagging filter 232 may obtain the information in picture 202b, for example, by utilizing a computerized image processing of pictures 202b and comparison other information or pictures a database. Alternatively, tagging filter 232 may utilize information from other sources; for example, the information in picture 204b and metadata tag 212b.

In the present embodiment, tagging filter 232 is configured to determine if a picture violates a decency guideline. A decency guideline might be violated, for instance, if a picture contains imagery that is inappropriate for viewing by minors. After evaluating pictures 202b and 204b and associated metadata tags 210b and 212b, tagging filter 232 generates corresponding pictures 202c and 204c and associated metadata tags 210c and 212c, as well as new associated metadata tag 218c, in group 222b. Metadata tag 218c is associated with picture 202c, and indicates that picture 202c may contain indecent content.

Tagging filter 234 evaluates videos 206b and 208b and associated metadata tags 214b and 216b of group 224a in a fashion similar to that utilized by tagging filter 232 on the contents of group 222a. Tagging filter 234, in the present embodiment, is configured to determine if a video violates a decency guideline. Like the picture decency guideline applied by tagging filter 232, the video decency guideline applied by tagging filter 234 might be violated, for instance, if a video contains imagery that is inappropriate for viewing by minors. After evaluating videos 206b and 208b and associated metadata tags 214b and 216b, tagging filter 234 generates corresponding videos 206c and 208c and associated metadata tags 214c and 216c, as well as new associated metadata tag 220c, in group 224b. Metadata tag 220c is associated with video 206c, and indicates that video 206c may contain indecent content.

Thus, the result of evaluating the contents of groups 222a and 224a with tagging filters 232 and 234 is corresponding groups 222b and 224b. MALM 240 can then proceed by evaluating the contents of groups 222b and 224b with grouping filter 236. Grouping filter 236, like grouping filter 230, can separate media assets into different groups based on the information in metadata tags associated with those media assets. Furthermore, grouping filter 236 can similarly be implemented as, for example, software executing on a computer processor (not shown), or as a human using a computer terminal (not shown).

In the present embodiment, grouping filter 236 is configured to separate media assets that have been associated with a metadata tag indicative of indecent content from those that have not. Thus, after evaluating metadata tags 210c through 220c, grouping filter 236 generates group 226a, which includes picture 202d, video 206d, and associated metadata tags 210d, 214d, 218d, and 220d, and group 228a, which includes picture 204d, video 208d, and associated metadata tags 212d and 216d. Notably, the contents of groups 226a and 228a do not correspond to the contents of groups 222b and 224b. Group 226a is a group of media assets that have been associated with metadata tags indicative of indecent content, and group 228a is a group of media assets that have not been so associated.

After being generated by grouping filter 236, pictures 202d and 204d, videos 206d and 208d, and associated metadata tags 210d through 220d can be evaluated by executive 238. Unlike tagging and grouping filters 230 through 236, executive 238 has abilities that extend beyond associating and dissociating metadata tags and separating media assets into groups; for example, executive 238 can modify or delete a media asset. Executive 238 can be implemented, for example, as software executing on a computer processor (not shown), or as a human using a computer terminal (not shown).

In this embodiment, executive 238 may perform final reviews of media assets that have been associated with metadata tags indicative of indecent content. For example, executive 238 may delete picture 202d and associated metadata tags 210d and 218d, thereby generating deleted picture 202e and associated deleted metadata tags 210e and 218e, upon confirming that picture 202d contains indecent content. Deleted picture 202e may be erased from a storage medium in MALM 140, or may be retained in some inactive capacity. In contrast, upon performing a final review of video 206d and deciding that video 206d is not indecent, executive 238 may opt to retain video 206d and associated metadata tag 214d, and delete inaccurate metadata tag 220d, thereby generating video 206e, associated metadata tag 214e, and deleted metadata tag 220e.

Thus, in MALM 240, the application of tagging and grouping filters 230 through 236 and executive 238 allows for the efficient management of the lifecycles of pictures 202a and 204a and videos 206a and 208a. Utilizing a number of steps, MALM 240 isolates potentially indecent media assets, performs a final review of those media assets, deletes indecent picture 202a (at 202e), and retains picture 204a and videos 206a and 208a (at picture 204d and videos 208d and 206e). A notable advantage of MALM 240 is that because of the work done by filters 230 through 236, executive 238 need only evaluate a small portion of the media assets originally imported into the system. Thus, executive 238 can afford to give more intense scrutiny to suspect media assets, or can spend less overall resources evaluating suspect media assets. In contrast, present conventional methods and systems for achieving similar results apply executive review in an ad-hoc, inefficient fashion.

Figure 3:
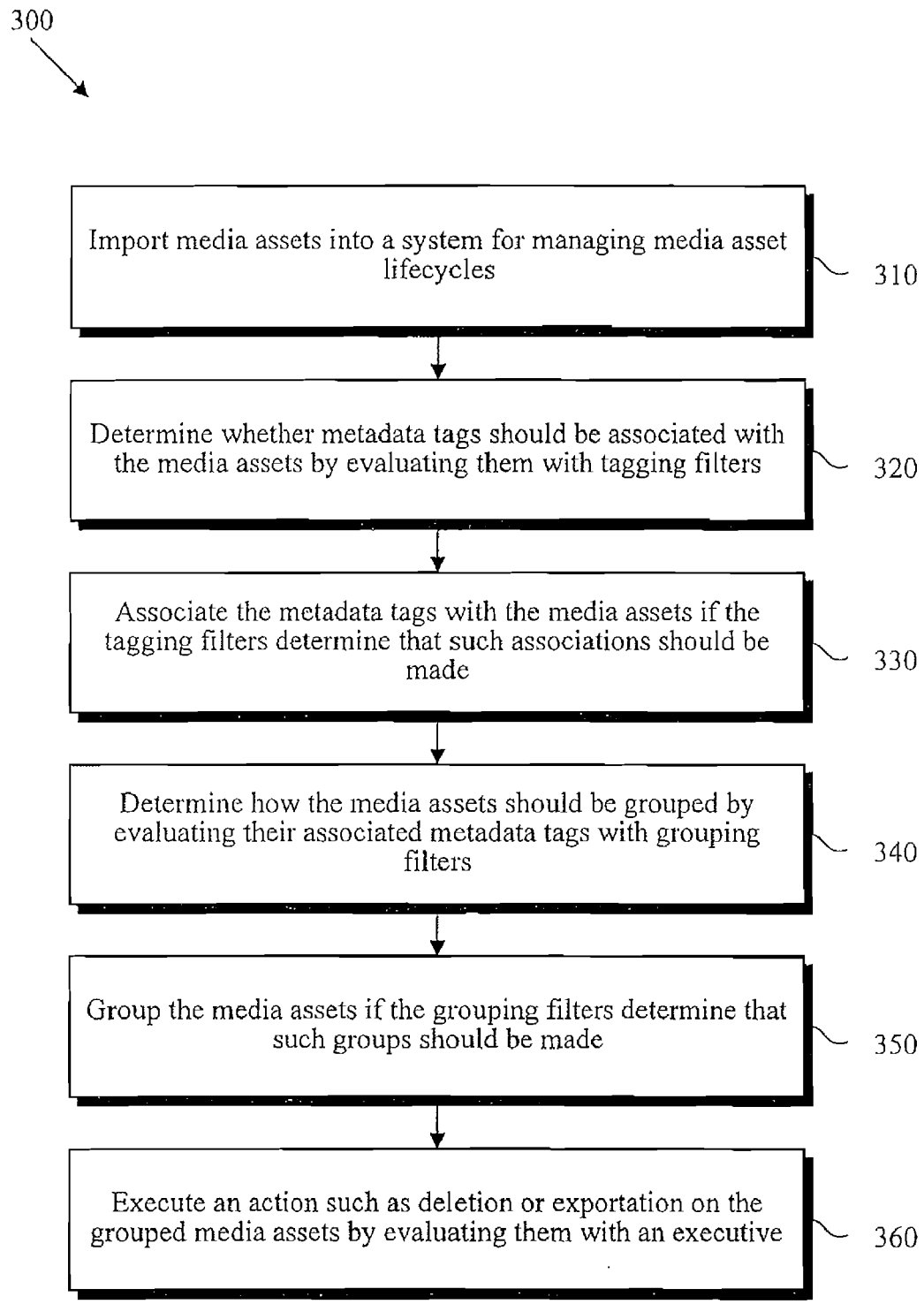
FIG. 3 is a flowchart presenting a method of managing the lifecycles of media assets, according to one embodiment of the present invention.

FIG. 3 shows flowchart 300 of an exemplary method of managing the lifecycles of media assets. Certain details and features have been left out of flowchart 300 that are apparent to a person of ordinary skill in the art. For example, a step may comprise one or more substeps or may involve specialized equipment or materials, as known in the art. While steps 310 through 360 indicated in flowchart 300 are sufficient to describe one embodiment of the present invention, other embodiments of the invention may utilize steps different from those shown in flowchart 300.

In step 310 of flowchart 300, a system for managing the lifecycles of media assets imports one or more media assets. Some embodiments of the present invention may be capable of managing only one media asset at once, while other embodiments may be capable of managing many media assets at once. Some embodiments of the present invention may store hard copies of imported media assets, while other embodiments may store imported media assets on digital storage devices such as hard disk drives. A media asset imported into the system can be a picture, a video, an audio recording, or any other conceivable instance of media.

Moving on with flowchart 300, step 320 comprises evaluating the imported media asset or assets with one or more tagging filters to determine if metadata tags should be associated with them. Tagging filters can be implemented in the media asset lifecycle management system by any mechanism capable of examining a media asset against a set of criteria. For example, in one embodiment, a tagging filter may be a computer program running in software that searches digital picture files for copyrighted imagery. If a tagging filter determines that a particular media asset fails to meet its evaluation criteria, no further action needs to be taken, but if a particular media asset does meet the evaluation criteria of the filter, an association step may be taken.

Step 330 of flowchart 300 comprises associating a metadata tag with a media asset, after a tagging filter has determined that such an association is appropriate. For example, if a tagging filter determines that a particular media asset contains copyrighted material, then a metadata tag indicating that fact will be associated with the media asset. For example, an association step might entail imprinting a photograph with a human-readable copyright stamp, or might entail linking a digital picture record with a metadata tag record in a database. By associating a metadata tag with a media asset, persistent information can be tied to the media asset as it is processed through the media asset lifecycle management system.

Moving on with flowchart 300, step 340 comprises evaluating media assets according to the metadata tags they are associated with, if any, by using a grouping filter. Grouping filters can be implemented in the media asset lifecycle management system by any mechanism capable of examining a metadata tag against a set of criteria. Thus, in one embodiment, a grouping filter may be implemented as an optical scanner for scanning tagged photographs, while in another embodiment a grouping filter may be implemented as a database query.

Step 350 of flowchart 300 comprises grouping media assets and associated metadata tags, if any, after evaluating them with a grouping filter. In one embodiment, for example, media assets may be grouped with a mechanical sorter for sorting photographs into different stacks. In another embodiment, media assets may be grouped with a database query that outputs two or more sets of database records.

Step 360 of flowchart 300 comprises evaluating grouped media assets and associated metadata tags by utilizing an executive. An executive may be implemented as any mechanism capable of performing executive tasks, such as deletion or exportation from the media asset lifecycle management system. After evaluation, an executive may delete some or all of the media assets in a group, or place evaluated media assets into new or different groups. For example, in one embodiment an executive may be a person who examines a stack of photos bearing imprinted copyright tags, while in another embodiment an executive may be a database query that has record deletion privileges. By evaluating media assets in specific groups, instead of evaluating media assets in entire sets, an executive can conserve resources or give each media asset more intense scrutiny.

Thus, the present application discloses a method and system for managing the lifecycles of media assets. By importing media assets into a system for managing their lifecycles, one embodiment of the present invention collects those media assets for convenient review. By utilizing tagging and grouping filters in advantageous combinations, media assets that have been imported can be evaluated and sorted into groups of varying characteristics, for further efficient evaluation by additional tagging and grouping filters or by executives. In various embodiments of the present invention, executives may override the prior evaluations of filters, delete media assets, or export media assets from the lifecycle management systems for external use.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method for managing a plurality of pictures, the method comprising:
    importing the plurality of pictures and a plurality of metadata associated with the plurality of pictures from a camera into a computer system having a memory and a processor for managing the plurality of pictures;
    determining, using one or more automated tagging filters, one or more metadata tags for association with the plurality of pictures by comparing information obtained from one of the plurality of pictures using a computerized image processing with a costume to detect an existence of a costumed person in addition to guests of a theme park in the one of the plurality of pictures;
    associating the one or more metadata tags with the one of plurality of pictures after the determining;
    grouping the plurality of pictures according to the one or more metadata tags associated with the one of plurality of pictures by evaluating the one or more metadata tags with one or more grouping filters to generate a plurality of picture groups; and
    exporting one of the plurality of picture groups including the one of the plurality of pictures having the costumed person in addition to guests of the theme park for royalty payment.

2. The method of claim 1 further comprising: publishing the one of the plurality of pictures.

3. The method of claim 1 further comprising importing one or more external metadata tags associated with the plurality of pictures.

4. The method of claim 3 further comprising grouping the plurality of pictures according to the one or more metadata tags and the one or more external metadata tags associated with the plurality of pictures to generate the plurality of picture groups.

5. A computer system for managing the lifecycles of a plurality of pictures including a first picture and a second picture, the computer system comprising:
    a processor; and
    a memory in communication with the processor, the memory including:
        one or more metadata tags, the one or more metadata tags being configured to associate with the plurality of pictures;

one or more automated tagging filters, the one or more automated tagging filters being configured to determine one or more metadata tags for association with the plurality of pictures by comparing information obtained from one of the plurality of pictures using a computerized image processing with a costume to detect an existence of a costumed person in addition to guests of a theme park in the one of the plurality of pictures, and associate the one or more metadata tags with the one of plurality of pictures after determining;

one or more grouping filters, the one or more grouping filters being configured to grouping the plurality of pictures according to the one or more metadata tags associated with the one of plurality of pictures by evaluating the one or more metadata tags with one or more grouping filters to generate a plurality of picture groups; and wherein the computer system is configured to export one of the plurality of picture groups including the one of the plurality of pictures having the costumed person in addition to guests of the theme park for royalty payment.

6. The computer system of claim 5, wherein the computer system is configured to publish the one of the plurality of pictures.

7. The computer system of claim 5, wherein the computer system is configured to import one or more external metadata tags associated with the plurality of pictures.

8. The computer system of claim 7, wherein the computer system is configured to group the plurality of pictures according to the one or more metadata tags and the one or more external metadata tags associated with the plurality of pictures to generate the plurality of picture groups.

* * * * *